United States Patent
Wagner et al.

(10) Patent No.: US 10,013,267 B1
(45) Date of Patent: Jul. 3, 2018

(54) PRE-TRIGGERS FOR CODE EXECUTION ENVIRONMENTS

(71) Applicant: Amazon Technologies, Inc., Seattle, WA (US)

(72) Inventors: Timothy Allen Wagner, Seattle, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/971,934

(22) Filed: Dec. 16, 2015

(51) Int. Cl.
G06F 9/455 (2018.01)

(52) U.S. Cl.
CPC ...... G06F 9/45516 (2013.01); G06F 9/45558 (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,708,276 B1 | 3/2004 | Yarsa et al. | |
| 7,036,121 B1 | 4/2006 | Casabona et al. | |
| 7,665,090 B1 | 2/2010 | Tormasov et al. | |

(Continued)

FOREIGN PATENT DOCUMENTS

| | | |
|---|---|---|
| EP | 2663052 A1 | 11/2013 |
| WO | WO 2009/137567 A1 | 11/2009 |

(Continued)

OTHER PUBLICATIONS

Adapter Pattern, Wikipedia, https://en.wikipedia.org/w/index.php?title=Adapter_pattern&oldid=654971255, [retrieved May 26, 2016], 6 pages.

(Continued)

*Primary Examiner* — Dong Kim
(74) *Attorney, Agent, or Firm* — Knobbe, Martens, Olson & Bear, LLP

(57) ABSTRACT

Systems and methods are described for managing initialization of virtual machine instances within an on-demand code execution environment or other distributed code execution environment. Such environments utilize pre-initialized virtual machine instances to enable execution of user-specified code in a rapid manner, without delays typically caused by initialization of the virtual machine instances. However, because the number of pre-initialized virtual machine instances maintained at an on-demand code execution environment is typically limited, insufficient number of pre-initialized virtual machine instances may be available at the on-demand code execution environment during times of heavy use. Embodiments described herein utilize pre-trigger notifications to indicate to the on-demand code execution environment that subsequent requests to execute user-specified code are likely to occur. The on-demand code execution environment may therefore pre-initialize additional virtual machine instances in preparation for the subsequent requests, reducing delay that would be required to initialize the instances after obtaining to the requests.

24 Claims, 5 Drawing Sheets

(56) References Cited

U.S. PATENT DOCUMENTS

| | | |
|---|---|---|
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 2002/0172273 A1 | 11/2002 | Baker et al. |
| 2003/0071842 A1 | 4/2003 | King et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1* | 9/2005 | Kokusho .............. G06F 9/5083 709/225 |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1* | 5/2010 | Spiers ..................... G06F 9/50 718/105 |
| 2010/0186011 A1 | 7/2010 | Magenheimer |
| 2010/0198972 A1 | 8/2010 | Umbehocker |
| 2010/0199285 A1* | 8/2010 | Medovich .......... G06F 9/45533 718/104 |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1* | 2/2011 | Arasaratnam ....... G06F 9/45558 718/1 |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |

(56) References Cited

U.S. PATENT DOCUMENTS

| | | |
|---|---|---|
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1* | 3/2013 | Lui ............... H04L 67/10 709/226 |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1* | 5/2013 | Chang ............ G06F 9/45545 718/1 |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1* | 8/2013 | Shen ............... G06F 9/455 709/217 |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0275975 A1 | 10/2013 | Masuda et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1* | 7/2014 | Thibeault ......... H04L 67/2847 709/219 |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1* | 8/2015 | Gusev ............... G06F 17/30477 706/12 |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1* | 12/2015 | Lemus ............ H04N 21/23116 725/92 |
| 2015/0363181 A1 | 12/2015 | Alberti et al. |
| 2015/0371244 A1* | 12/2015 | Neuse ............... G06Q 30/0202 705/7.31 |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0164797 A1 | 6/2016 | Reque et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0364265 A1 | 12/2016 | Cao et al. |
| 2016/0371127 A1 | 12/2016 | Antony et al. |
| 2017/0090961 A1 | 3/2017 | Wagner et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2018/0004553 A1 | 1/2018 | Wagner et al. |
| 2018/0004572 A1 | 1/2018 | Wagner et al. |

FOREIGN PATENT DOCUMENTS

| | | |
|---|---|---|
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

(56) References Cited

OTHER PUBLICATIONS

Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Zheng, C., and D. Thain, Integrating Containers into Workflows: A Case Study Using Makeflow, Work Queue, and Docker, VTDC '15, Jun. 15, 2015, Portland, Oregon, pp. 31-38.
Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.
Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.
International Search Report and Written Opinion in PCT/US2015/052810dated Dec. 17, 2015, 18 pages.
International Search Report and Written Opinion in PCT/US2015/052838dated Dec. 18, 2015, 23 pages.
International Search Report and Written Opinion in PCT/US2015/052833dated Jan. 13, 2016, 17 pages.
International Search Report and Written Opinion in PCT/US2015/064071dated Mar. 16, 2016, 17 pages.
International Search Report and Written Opinion in PCT/US2016/016211dated Apr. 13, 2016 11 pages.
"Anonymous: ""Docker run reference"", Dec. 7, 2015, XP055350246, Retrieved from the Internet:URL:https://web.archive.org/web/20151207111702/https:/docs.docker.com/engine/reference/run/[retrieved on Feb. 28, 2017]."
International Preliminary Report on Patentability in PCT/US2015/052810 dated Apr. 4, 2017.
International Preliminary Report on Patentability in PCT/US2015/052838 dated Apr. 4, 2017.
International Search Report and Written Opinion in PCT/US2016/066997 dated Mar. 20, 2017.
Amazon, "AWS Lambda: Developer Guide", Retrieved from the Internet, Jun. 26, 2016, URL : http://docs.aws.amazon.com/lambda/latest/dg/lambda-dg.pdf.
Ben-Yehuda et al., "Deconstructing Amazon EC2 Spot Instance Pricing", ACM Transactions on Economics and Computation 1.3, 2013, 15 pages.
Hoffman, Auto scaling your website with Amazon Web Services (AWS—Part 2, Cardinalpath, Sep. 2015, 15 pages.
International Preliminary Report on Patentability in PCT/US2015/052833 dated Apr. 4, 2017.
International Preliminary Report on Patentability in PCT/US2015/064071 dated Jun. 6, 2017.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

PRE-TRIGGERS FOR CODE EXECUTION ENVIRONMENTS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
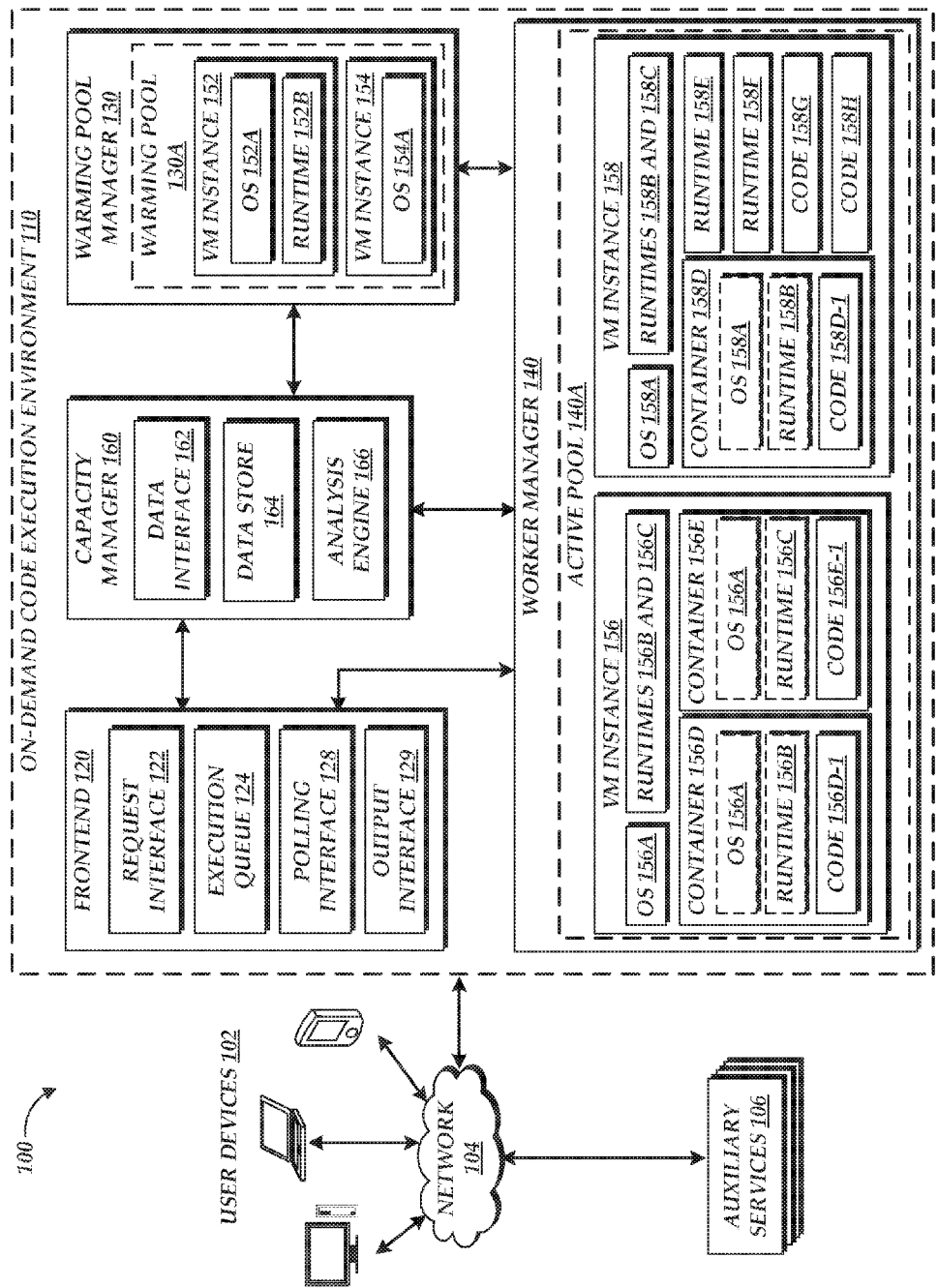
FIG. 1 is a block diagram depicting an illustrative environment in which an on-demand code execution environment can operate, the on-demand code execution environment including a capacity manager to modify a number of pre-initialized virtual machine instances within the on-demand code execution environment based on pre-triggers indicating later use of the pre-initialized virtual machine instances.

Generally described, aspects of the present disclosure relate to managing a number of virtual machine instances that are pre-initialized on low latency, on-demand code execution environments based on pre-trigger data that indicates a potential future use of those virtual machine instances. As described in detail herein, an on-demand code execution environment may provide a network-accessible service enabling users to submit or designate computer-executable code to be executed by virtual machine instances of the on-demand code execution environment. Each set of code on the on-demand code execution environment may define a "task," and implement specific functionality corresponding to that task when executed on the on-demand code execution environment. Individual implementations of the task on the on-demand code execution environment may be referred to as an "execution" of the task. The on-demand code execution environment can further enable users to trigger execution of a task based on a variety of potential events, such as transmission of an application programming interface ("API") call or a specially formatted hypertext transport protocol ("HTTP") packet. Thus, users may utilize the on-demand code execution environment to execute any specified executable code, without requiring configuration or maintenance of the underlying hardware or infrastructure on which the code is executed. Further, the on-demand code execution environment may be configured to execute tasks in a rapid manner (e.g., in under 100 milliseconds [ms]). To enable rapid execution, the on-demand code execution environment can include one or more virtual machine instances that are "pre-warmed" or pre-initialized (e.g., booted into an operating system and executing a complete or substantially complete runtime environment) and configured to enable execution of user-defined code, such that the code may be executed rapidly without delay caused by initializing the virtual machine instance in response to a request to execute the code. Thus, when an execution of a task is triggered, the code corresponding to that task can be executed within a pre-initialized virtual machine in a very short amount of time. However, where a large number of tasks are triggered simultaneously (or nearly simultaneously), the number of pre-initialized virtual machines may not be sufficient to execute each task immediately, which may result in delays as new virtual machines are initialized (e.g., booted into an operating system and loaded with a runtime environment). To address this issue, the present application enables the on-demand code execution environment to utilize "pre-trigger" notifications from clients to predictively manage the number of pre-initialized virtual machine instances that are maintained on the on-demand code execution environment. These "pre-trigger" notifications (or "pre-triggers") can inform the on-demand code execution environment about activities or events that likely indicate a subsequent trigger of a task on the on-demand code execution environment will occur. For example, where a task on the on-demand code execution environment is utilized to execute code supporting a purchasing process, the addition of an item to a "shopping cart" may indicate that execution of the task will be required shortly. Thus, a user may notify the on-demand code execution environment when a user adds an item to a shopping cart, and the on-demand code execution environment may ensure that a sufficient number of pre-initialized virtual machines are available to process the corresponding task. In some instances, pre-initialization may include loading a virtual machine instance with generic or basic software (e.g., an operating system, commonly used runtime environments, permissions to access commonly used computing resources, etc.). In other instances, pre-initialization may include configuring a virtual machine instances according to the requirements of the task (e.g., loaded with code corresponding to the task and any required software, configured with appropriate permissions and access to computing resources, etc.). If additional virtual machine instances are required, they may be pre-initialized on reception of the pre-trigger, such that when the task is actually triggered, it can be completed in a short amount of time (e.g., without delay caused by initialization of a virtual machine instance). Thus, by predictively managing a number of pre-initialized virtual machine instances based on pre-trigger notifications, the ability to rapidly execute user-specified code within an on-demand code execution environment is improved.

In one embodiment, pre-triggers may directly provide information to the on-demand code execution environment regarding predicted future events (e.g., API calls) that trigger execution of tasks on that environment. For example, a user may transmit to the on-demand code execution environment a pre-trigger that indicates that the user (or a service associated with the user) will require n task executions (e.g., of the same or multiple tasks) at a given point or range in time (e.g., an absolute point or range of time or a range or point in time relative to when the pre-trigger transmission occurs). In another embodiment, the on-demand code execution environment may maintain data correlating pre-trigger notifications to subsequent events that trigger task executions. For example, the on-demand code execution environment may maintain a listing of pre-triggers received from a specific user, as well as subsequent events triggering execution of a task on behalf of that user. The on-demand code execution environment can then compile that information to determine a statistical likelihood that a given pre-trigger results in a set of subsequent task executions, as well as the timing for those subsequent task executions. Illustratively, where the pre-trigger notification indicates additional of an item to a "shopping cart," the on-demand code execution environment may determine that, on average, that pre-trigger is followed by 0.7 task executions (or that there is a 70% chance of 1 task execution) within a specified time range. In still more embodiments, the on-demand code execution environment may combine information specified in the pre-trigger notification with correlation information. For example, where a pre-trigger notification indicates a number of future task executions that are predicted to be required, as well as timing of those task executions, the on-demand code execution environment may utilize historical correlation data to determine the accuracy of that information. Illustratively, the on-demand code execution environment may determine that pre-triggers for a specific user tend to overestimate the number of subsequent task executions that will occur, and thus, the estimated number of task executions should be reduced by the on-demand code execution environment.

After determining a predicted number and timing of task executions to occur based on a pre-trigger, the on-demand code execution environment may manage the number of pre-initialized virtual machine instances that are maintained at the on-demand code execution environment based on those predictions. For example, the on-demand code execution environment may determine a number of virtual machine instances needed to complete the task executions, and initialize at least that number of virtual machine instances, such that those instances are pre-initialized when the task executions are received.

In one embodiment, the number of task executions that may be handled by a virtual machine instance in a given period of time (e.g., simultaneously, within 100 ms, etc.) can be fixed by the on-demand code execution environment. For example, the on-demand code execution environment may be configured such that a single virtual machine instance is required to execute each task, or such that a predefined number of tasks can be handled by a single virtual machine instance in the given period of time. In another embodiment, the number of task executions that may be handled by a virtual machine instance in a given period of time may vary based on attributes of the task. For example, the on-demand code execution environment may be configured to process up to n number of tasks for the same user on a single virtual machine instances, but to require separate virtual machine instances to execute tasks on behalf of different users. As a further example, the on-demand code execution environment may be configured to vary the amount of tasks executable on a single virtual machine instance based on attributes of those tasks, such as the number of lines of code required to execute the task, historical execution times of the task, or historical computing resources used in executing a task. By comparing the number of task executions predicted based on a given pre-trigger, and determining the number of virtual machine instances required to handle those task executions, the on-demand code execution environment can determine a number of virtual machine instances required to execute the task executions predicted based on a given pre-trigger, and ensure that that number of virtual machine instances are available and pre-initialized on the on-demand code execution environment prior to detecting events that trigger the respective task executions. For example, when the on-demand code execution environment maintains different sets of virtual machine instances configured for different uses, users, or tasks, it may use the pre-trigger notifications (or the subsequent requests predicted to occur based on the pre--trigger notifications) to adjust the number of virtual machine instances within those subsets (e.g., as an absolute or relative amount), for example by increasing the allocation to the type of machines, containers, setup, libraries, or other configurations or software components required to fulfill the subsequent requests predicted to occur based on the pre-trigger notifications.

In some instances, the on-demand code execution environment may utilize pre-trigger information to increase the number of pre-initialized virtual machine instances maintained at the on-demand code execution environment. For example, where the on-demand code execution environment typically maintains 200 pre-initialized virtual machine instances, and a pre-trigger notification is received that indicates a predicted 100 virtual machine instances will soon be required to execute tasks, the on-demand code execution environment may initialize an additional 100 virtual machine instances, such that a total of 300 pre-initialized virtual machine instances are maintained at the on-demand code execution environment. In another embodiment, the on-demand code execution environment may utilize pre-trigger information to ensure that the number of pre-initialized virtual machine instances exceeds that predicted to be required based on pre-trigger notifications. Accordingly, in the example described above (where a typical 200 instances are maintained in a pre-initialized state, and 100 instances are predicted to be needed based on a received pre-trigger), no action may be required at the on-demand code execution environment. In yet another embodiment, the on-demand code execution environment may utilize a combination of pre-trigger information and historical information regarding loads experienced at the on-demand code execution environment to manage a current number of pre-initialized virtual machine instances. For example, where historical load information indicates that x number of pre-initialized virtual machine instances are required to handle the general load on the on-demand code execution environment, and y number of pre-initialized virtual machine instances are predicted to be required based on a pre-trigger notification, the on-demand code execution environment may be configured to ensure that at least x+y virtual machine instances are maintained at the on-demand code execution environment in a pre-initialized state during the relevant time period. In some instances, the on-demand code execution environment may manage the number of pre-initialized virtual machines instances at least partly by modifying a manner in which virtual machine instances are de-initialized (e.g., shutdown or removed from the on-demand code execution environment). For example, the on-demand code execution environment may typically be configured to conduct "garbage collection" on virtual machine instances that were previously utilized to execute a task, but are no longer executing a task. In such instances, the on-demand code execution environment may utilize pre-trigger information to maintain those virtual machine instances, rather than removing the instances.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 ("the '648 Application), the entirety of which is hereby incorporated by reference.

As will be appreciated by one skilled in the art, the embodiments described herein function to improve the functioning of computing devices by enabling those devices to efficiently pre-initialize virtual machine instances, such that a subsequent request to execute user-specified code can be quickly fulfilled on the pre-initialized device. Specifically, the pre-initialization of virtual machine instances can be based on pre-triggers, than enable computing devices to predict subsequent events triggering code execution before those events actually occur. Thus, the embodiments described herein solve technical problems related to the limited speed at which computing devices can be initialized to execute user-specified code, as well as the costs in terms of computing resources needed to maintain virtual machine instances in a pre-initialized state. The embodiments described herein solve such technical problems by use of a technical solution, namely, the transmission of pre-trigger notifications from clients that indicate a potential future need for pre-initialized virtual machine instances. In addition, embodiments described herein provide further technical solutions to these problems, including the use of correlation data to determine a number of virtual machine instances predicted to be needed based on a pre-trigger notification, the timing at which those virtual machine instances are predicted to be required, and the configurations used to pre-initialize the virtual machine instances for execution of tasks corresponding to the pre-trigger notification. Thus, one skilled in the art will appreciate by virtue of the present disclosure that the embodiments described herein represent a substantial contribution to the technical field of virtual machine usage management and to computing devices in general.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which an on-demand code execution environment 110 may operate based on communication with user computing devices 102 and auxiliary services 106. By way of illustration, various example user computing devices 102 are shown in communication with the on-demand code execution environment 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution environment 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution environment 110, or with third parties), data bases, really simple syndication ("RSS") readers, social networking sites, or any other source of network-accessible service or data source. In some instances, auxiliary services 106 may be associated with the on-demand code execution environment 110, e.g., to provide billing or logging services to the on-demand code execution environment 110. In some instances, auxiliary services 106 actively transmit information, such as API calls or other task-triggering information, to the on-demand code execution environment 110. In other instances, auxiliary services 106 may be passive, such that data is made available for access by the on-demand code execution environment 110. As described below, components of the on-demand code execution environment 110 may periodically poll such passive data sources, and trigger execution of tasks within the on-demand code execution environment 110 based on the data provided. While depicted in FIG. 1 as distinct from the user computing devices 102 and the on-demand code execution environment 110, in some embodiments, various auxiliary services 106 may be implemented by either the user computing devices 102 or the on-demand code execution environment 110.

The user computing devices 102 and auxiliary services 106 may communication with the on-demand code execution environment 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein.

Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution environment 110 is illustrated as connected to the network 104. In some embodiments, any of the components within the on-demand code execution environment 110 can communicate with other components of the on-demand code execution environment 110 via the network 104. In other embodiments, not all components of the on-demand code execution environment 110 are capable of communicating with other components of the virtual environment 100. In one example, only the frontend 120 may be connected to the network 104, and other components of the on-demand code execution environment 110 may communicate with other components of the virtual environment 100 via the frontend 120.

In FIG. 1, users, by way of user computing devices 102, may interact with the on-demand code execution environment 110 to provide executable code, and establish rules or logic defining when and how such code should be executed on the on-demand code execution environment 110. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user computing devices 102) to provide, request execution of, and view results of computer executable code. As shown in FIG. 1, the frontend 120 includes a variety of components to enable interaction between the on-demand code execution environment 110 and other computing devices. Specifically, the frontend 120 includes a request interface 122, a job queue 124, a distribution manager 126, a polling interface 128, and an output interface 129. The request interface 122 may provide user computing devices 102 with the ability to upload or otherwise communication user-specified code to the on-demand code execution environment 110, and to thereafter request execution of that code. In one embodiment, the request interfaces 122 communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution environment 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution environment 110) prior to the request being received by the on-demand code execution environment 110. The on-demand code execution environment 110 may vary its execution strategy for a task based on where the code of the task is available at the time a call for the task is processed.

The request interface 122 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution environment 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution environment 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution environment 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution environment 110 may inspect the call and look for the flag or the header, and if it is present, the on-demand code execution environment 110 may modify the behavior (e.g., logging facilities) of the container in which the task is executed, and cause the output data to be provided back to the user. In some embodiments, the behavior/mode indicators are added to the call by the user interface provided to the user by the on-demand code execution environment 110. Other features such as source code profiling, remote debugging, etc. may also be enabled or disabled based on the indication provided in a call.

To manage requests for code execution, the frontend 120 further includes an execution queue 124, which can maintain a record of user-requested task executions. Illustratively, the number of simultaneous task executions by the on-demand code execution environment 110 is limited, and as such, new task executions initiated at the on-demand code execution environment 110 (e.g., via an API call) may be placed on the execution queue 124 and processed, e.g., in a first-in-first-out order. In some embodiments, the on-demand code execution environment 110 may include multiple execution queues 124, such as individual execution queues 124 for each user account. For example, users of the on-demand code execution environment 110 may desire to limit the rate of task executions on the on-demand code execution environment 110 (e.g., for cost reasons). Thus, the on-demand code execution environment 110 may utilize an account-specific execution queue 124 to throttle the rate of simultaneous task executions by a specific user account. In some instances, the on-demand code execution environment 110 may prioritize task executions, such that task executions of specific accounts or of specified priorities bypass or are prioritized within the execution queue 124. The number and configuration of execution queues 124 may in some instances be modified based on pre-trigger notifications received at the on-demand code execution environment 110 (e.g., based on a predicted number of subsequent task calls to be received based on the pre-trigger notifications). In other instances, the on-demand code execution environment 110 may execute tasks immediately or substantially immediately after receiving a call for that task, and thus, the execution queue 124 may be omitted.

As noted above, tasks may be triggered for execution at the on-demand code execution environment 110 based on explicit calls from user computing devices 102 (e.g., as received at the request interface 120). Alternatively or additionally, tasks may be triggered for execution at the on-demand code execution environment 110 based on data retrieved from one or more auxiliary services 106. To facilitate interaction with auxiliary services 106, the frontend 120 can include a polling interface 128, which operates to poll auxiliary services 106 for data. Illustratively, the polling interface 128 may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution environment 110. Illustratively, criteria for execution of a task may include, but is not limited to, whether new data is available at the auxiliary services 106, the type or content of the data, or timing information corresponding to the data. In some embodiments, the on-demand code execution environment 110 may utilize pre-trigger notifications to modify the rate at which polling occurs with respect to an auxiliary service 106, the computing resources allocated to the polling interface 128, or other parameters regarding the polling interface 128. For example, where a pre-trigger notification indicates that new data is expected to be added to an auxiliary service 106 at a higher than normal rate (e.g., resulting in a higher than normal level of calls to execute a task corresponding to the new data), the on-demand code execution environment 110 may utilize the pre-trigger notification to increase the rate of polling to the auxiliary service 106.

In addition to tasks executed based on explicit user calls and data from auxiliary services 106, the on-demand code execution environment 110 may in some instances operate to trigger execution of tasks independently. For example, the on-demand code execution environment 110 may operate (based on instructions from a user) to trigger execution of a task at each of a number of specified time intervals (e.g., every 10 minutes). For example, the on-demand code execution environment 110 may periodically generate information regarding received pre-trigger notifications, actions taken based on pre-trigger notification, or determined correlations between pre-trigger notifications and subsequent task executions, and report that information to a relevant party (e.g., a user associated with the pre-trigger notifications, an administrator of the on-demand code execution environment 110, etc.).

The frontend 120 further includes an output interface 129 configured to output information regarding the execution of tasks on the on-demand code execution environment 110. Illustratively, the output interface 129 may transmit data regarding task executions (e.g., results of a task, errors related to the task execution, or details of the task execution, such as total time required to complete the execution, total data processed via the execution, etc.) or pre-trigger notifications (received pre-trigger notifications, actions taken based on pre-trigger notification, determined correlations between pre-trigger notifications and subsequent task executions, etc.) to the user computing devices 102 or to auxiliary services 106, which may include, for example, billing or logging services. The output interface 129 may further enable transmission of data, such as service calls, to auxiliary services 106. For example, the output interface 129 may be utilized during execution of a task to transmit an API request to an external service 106 (e.g., to store data generated during execution of the task).

To execute tasks, the on-demand code execution environment 110 includes a warming pool manager 130, which "pre-warms" (e.g., initializes) virtual machine instances to enable tasks to be executed quickly, without the delay caused by initialization of the virtual machines. The on-demand code execution environment 110 further includes a worker manager 140, which manages active virtual machine instances (e.g., currently assigned to execute tasks in response to task calls).

The warming pool manager 130 ensures that virtual machine instances are ready to be used by the worker manager 140 when the on-demand code execution environment 110 detects an event triggering execution of a task on the on-demand code execution environment 110. In the example illustrated in FIG. 1, the warming pool manager 130 manages the warming pool 130A, which is a group (sometimes referred to as a pool) of pre-initialized and pre-configured virtual machine instances that may be used to execute tasks in response to triggering of those tasks. In some embodiments, the warming pool manager 130 causes virtual machine instances to be booted up on one or more physical computing machines within the on-demand code execution environment 110 and added to the warming pool 130A. For example, the warming pool manager 130 may cause additional instances to be added to the warming pool 130A based on the available capacity in the warming pool 130A to service incoming calls. As will be described below, the warming pool manager 130 may further work in conjunction with other components of the on-demand code execution environment 110, such as the capacity manager 140, to add or otherwise manage instances and/or containers in the warming pool based on received pre-trigger notifications. In some embodiments, the warming pool manager 130 may utilize both physical computing devices within the on-demand code execution environment 110 and one or more virtual machine instance services to acquire and maintain compute capacity that can be used to service calls received by the frontend 120. Further, the on-demand code execution environment 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific call to execute a task. The predetermined set of configurations can correspond to various types of virtual machine instances to execute tasks. The warming pool manager 130 can optimize types and numbers of virtual machine instances in the warming pool 130A based on one or more metrics related to current or previous task executions. Further, the warming pool manager 130 can establish or modify the types and number of virtual machine instances in the warming pool 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's calls. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution environment 110, the user interface may prompt the user to specify one of the predetermined operating conditions for executing the task. In another example, the service-level agreement (SLA) for utilizing the services provided by the on-demand code execution environment 110 may specify a set of conditions (e.g., programming languages, computing resources, etc.) that tasks should satisfy, and the on-demand code execution environment 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pool 130A are usable by which user), among other specified conditions.

The worker manager 140 manages the instances used for servicing incoming calls to execute tasks. In the example illustrated in FIG. 1, the worker manager 140 manages the active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, the worker manager 140 may, based on information specified in a call to execute a task, create a new container or locate an existing container in one of the instances in the active pool 140A and assigns the container to the call to handle the execution of the task. In one embodiment, such containers are implemented as Linux containers.

Once a triggering event to execute a task has been successfully processed by the frontend 120, the worker manager 140 finds capacity to execute a task on the on-demand code execution environment 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution environment 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution environment 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution environment 110 may maintain a separate cache in which code of tasks are stored to serve as an intermediate level of caching system between the local cache of the virtual machine instances and a web-based network storage (e.g., not shown in FIG. 1). The various scenarios that the worker manager 140 may encounter in servicing the call are described in greater detail within the '648 application, incorporated by reference above (e.g., at FIG. 4 of the '648 application).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down. As discussed below, in some instances, determination of whether to keep the container and/or the instance running after the task is done executing may additionally or alternatively be based on pre-trigger notifications indicating that the container or instance may be required in the near future.

In some embodiments, the on-demand code execution environment 110 may provide data to one or more of the auxiliary services 106 as it executes tasks in response to triggering events. For example, the frontend 120 may communicate with the monitoring/logging/billing services included within the auxiliary services 106. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the tasks executed on the on-demand code execution environment 110. For example, the monitoring/logging/billing services may monitor and/or log various inputs, outputs, or other data and parameters on behalf of the tasks being executed on the on-demand code execution environment 110. As will be described in more detail below, the frontend 120 may additionally interact with auxiliary services 106 to receive pre-trigger notifications indicating a potential for subsequent calls to execute tasks on the on-demand code execution environment 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '648 application, incorporated by reference above (e.g., within FIG. 2 of the '648 application). In some instance, the instance allocation unit's operation may be modified based on expected incoming code execution requests, as predicted based on received pre-trigger notifications. For example, where the on-demand code execution environment 110 utilizes or has access to dynamically provisioned computing resources (such as dynamically provisioned network-based storage space, scalable access to processing power, etc.), the instance allocation unit may be configured to modify an amount of one or more of those dynamically provisioned computing resources. For example, the instance allocation unit may interact with a dynamically allocated network storage service (not shown in FIG. 1) to increase the amount of data storage available to virtual machine instances.

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution environment 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution environment 110 may comprise multiple frontends, multiple warming pool managers, and/or multiple worker managers. Although four virtual machine instances are shown in the example of FIG. 1, the embodiments described herein are not limited as such, and one skilled in the art will appreciate that the on-demand code execution environment 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the on-demand code execution environment 110 may comprise any number of warming pools and active pools.

In accordance with embodiments of the present disclosure, the on-demand code execution environment 110 further includes a capacity manager 160, which includes components enabling the number of virtual machine instances maintained by the on-demand code execution environment 110 in a pre-initialized state (e.g., in the warming pool 130A, the active pool 140A, or both) to be modified based on pre-trigger notifications. As will be described below, the capacity manager 160 can receive pre-event triggers, and transmit instructions to the warming pool manager 130 regarding task executions that are expected to be requested on the on-demand code execution environment 110. Moreover, the capacity manager 160 can analyze historical information to correlate pre-trigger notifications with subsequent triggering event, and to generate or modify data regarding the task executions that are expected to be requested based on a pre-trigger notification.

To enable interaction between the capacity manager 160 and the on-demand code execution environment 110, the capacity manager 160 includes a data interface 162, which interacts with the frontend 120 of the on-demand code execution environment 110 to receive data regarding pre-trigger notifications as well as task executions that are requested subsequent to those pre-trigger notifications, among other information. For example, data may be received from the request interface 122 to indicate that a pre-trigger notification has been received at the frontend 120 indicating that a specific activity has occurred with respect to a user (or other users associated with that user). Data may further be received indicating a number of subsequent task executions that are requested (e.g., after a triggering event) with respect to that user. In some instances, data regarding task executions may itself be considered a triggering event, which indicates likely subsequent calls to execute a task. For example, where execution of a first task frequently results in execution of a second task, a call to execute the first task may constitute a pre-trigger notification corresponding to the second task. In still more instances, groups of or patterns of task executions (e.g., defined by the tasks called, the timing of those calls, execution results, etc.), may be utilized as pre-triggers for one or more task calls.

The capacity manager 160 further includes a data store 164 to store the received data regarding pre-trigger notifications and subsequent task triggers. The data store 164 may correspond to any persistent or substantially persistent data storage, such as a hard drive (HDD), a solid state drive (SDD), network attached storage (NAS), a tape drive, or any combination thereof.

The capacity manager 160 further includes an analysis engine 166 configured to utilize pre-trigger notifications, alone or in conjunction with data from the data store 164, to predict a number and timing of task executions that will be requested subsequent to the pre-trigger notification. In one embodiment, the analysis engine 166 may utilize information specified within the pre-trigger notification to determine the number and timing of predicted executions. For example, a pre-trigger notification may indicate that n triggering events, each corresponding to a single task execution, are expected to occur in a given period of time. The capacity manager 160 can then utilize that information to determine a number of virtual machine instances required to serve those triggering events. In one embodiment, the analysis engine 166 may determine that a single virtual machine instance is required for each task execution caused by a triggering event. Thus, if n triggering events are expected to occur, n virtual machine instances may be required. In another embodiment, the analysis engine 166 may determine that multiple tasks corresponding to the triggering events can be executed on a single virtual machine instance (e.g., based on the user credentials associated with each task, the expected computing resources required to service the task, other attributes of the task, etc.), and thus, that less than n virtual machine instances are required. Based on this analysis by the analysis engine 166, the capacity manager 160 may then instruct other components of the on-demand code execution environment 110, such as the warming pool manager 130, to modify the number of virtual machine instances that are maintained in a pre-initialized state.

In another embodiment, the analysis engine 166 can further be configured to utilize historical information regarding the on-demand code execution environment 110 to correlate individual pre-trigger notifications to subsequent triggering of tasks. Illustratively, the analysis engine 166 may compare each pre-trigger notification received from an individual user to subsequent tasks executed on behalf of that user (e.g., all subsequent tasks, subsequent tasks received prior to a next pre-trigger notification, subsequent tasks received within a threshold time period after receiving the pre-trigger notification, etc.), to determine correlations between those pre-trigger notifications and subsequent tasks. In one embodiment, the analysis engine 166 may determine an average number and timing of task executions that occur for a user after receiving a given pre-trigger notification for that user, and utilize that information as predictive for subsequent occurrences of the pre-trigger notification. For example, where a given pre-trigger notification results in an average of three triggering events for a task an average of thirty seconds after receipt of the pre-trigger notification, the analysis engine 166 may predict that subsequent receipt of that pre-trigger notification will result in an average of three triggering events being detected thirty seconds later. In some instances, the analysis engine 166 may provide additional statistical information, such as an expected variance in the number of timing of triggering events predicted to occur subsequent to the pre-trigger notification. In still more instances, the analysis engine 166 may generate a distribution model (e.g., as may be represented as a chart or graph) for the number and timing of triggering events occurring subsequent to a pre-trigger notification. For example, with respect to a given pre-trigger notification, the analysis engine 166 may generate a distribution that plots the number of event triggers expected to occur versus the time passing subsequent to the pre-trigger notification. The statistical information generated by the analysis engine 166 can thereafter be used by the capacity manager 160 to manage the number of pre-initialized virtual machine instances that are maintained at the on-demand code execution environment 110 in total or with respect to a specific user or task.

While not shown in FIG. 1, in some embodiments, the on-demand code execution environment 110 may include multiple frontends 120. In such embodiments, a load balancer may be provided to distribute the incoming calls to the multiple frontends 120, for example, in a round-robin fashion. In some embodiments, the manner in which the load balancer distributes incoming calls to the multiple frontends 120 may be based on the state of the warming pool 130A and/or the active pool 140A. For example, if the capacity in the warming pool 130A is deemed to be sufficient, the calls may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the calls may be distributed to the multiple frontends 120 in a manner that reduces or minimizes the number of virtual machine instances taken from the warming pool 130A. For example, even if, according to a load balancing restriction, a call is to be routed to Frontend A, if Frontend A needs to take an instance out of the warming pool 130A to service the call but Frontend B can use one of the instances in its active pool to service the same call, the call may be routed to Frontend B.

Figure 2:
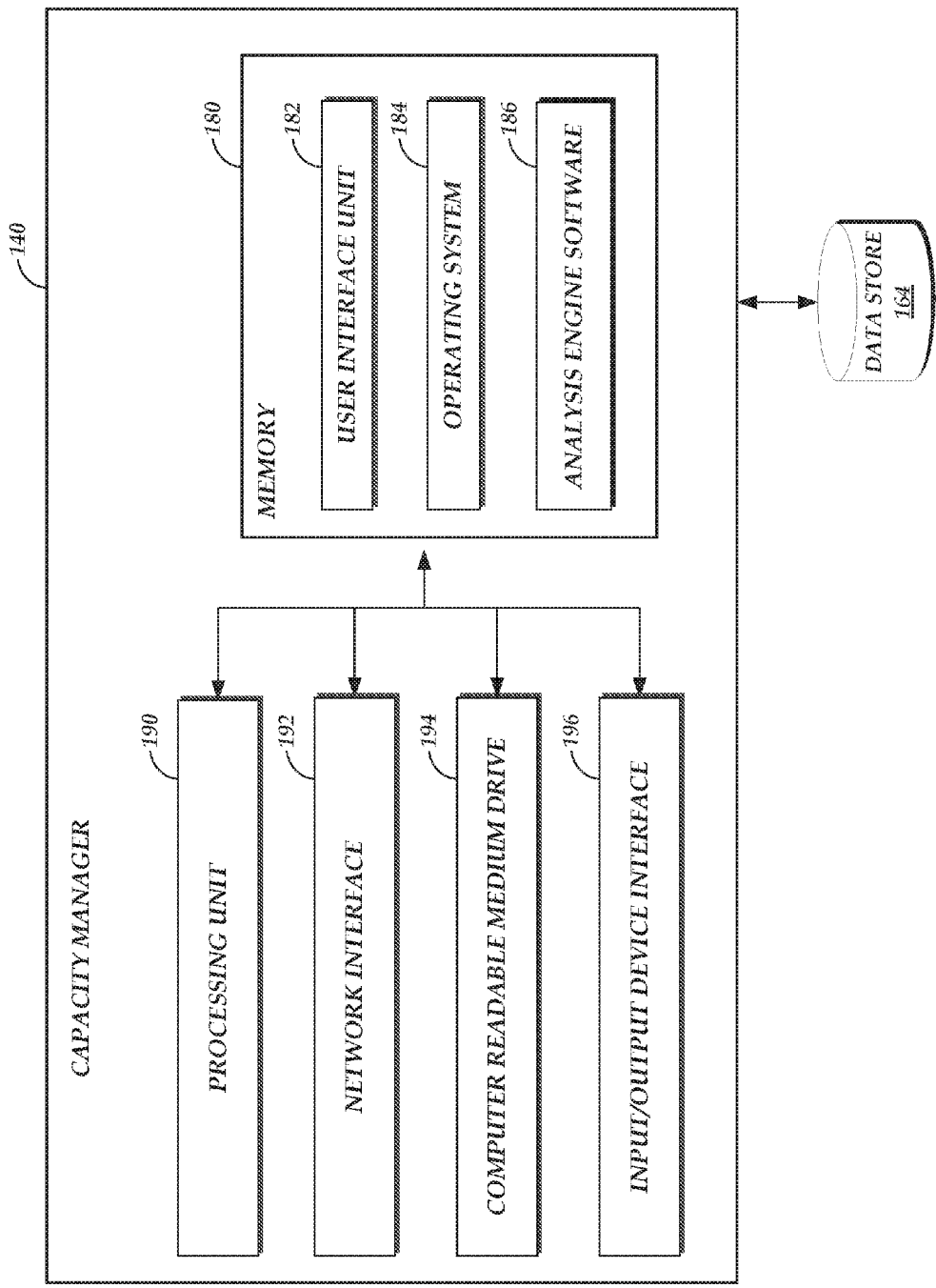
FIG. 2 depicts a general architecture of a computing device providing the capacity manager of FIG. 1.

FIG. 2 depicts a general architecture of a computing system (referenced as capacity manager 160) that implements embodiments of the present disclosure to manage the number of pre-initialized virtual machine instances maintained at the on-demand code execution environment 110 based on obtained pre-trigger notifications. The general architecture of the capacity manager 160 depicted in FIG. 2 includes an arrangement of computer hardware and software modules that may be used to implement aspects of the present disclosure. The hardware modules may be implemented with physical electronic devices, as discussed in greater detail below. The capacity manager 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the capacity manager 160 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer readable media. The memory 180 may store an operating system 184 that provides computer program instructions for use by the processing unit 190 in the general administration and operation of the capacity manager 160. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories, such as the data store 164.

In addition to and/or in combination with the user interface unit 182, the memory 180 may include analysis engine software 186 that corresponds to computer-executable instructions which, when executed by the capacity manager 160, implement the functions described above with respect to the analysis engine 166. While the analysis engine software 186 is shown in FIG. 2 as part of the capacity manager 160, in other embodiments, all or a portion of the instance allocation unit 186 and the user code execution unit 188 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the capacity manager 160.

While the computing device of FIG. 2 is described as implementing the capacity manager 160, the same or a similar computing device may additionally or alternatively be utilized to implement other components of the on-demand code execution environment 110. For example, such a computing device may be utilized, independently or in conjunction with other components (e.g., data stores) to implement the warming pool manager 130 or worker manager 140 of FIG. 1. The software or computer-executable instructions placed within the memory 180 may be modified to enable execution of the functions described herein with respect to the warming pool manager 130 or worker manager 140.

Figure 3A:
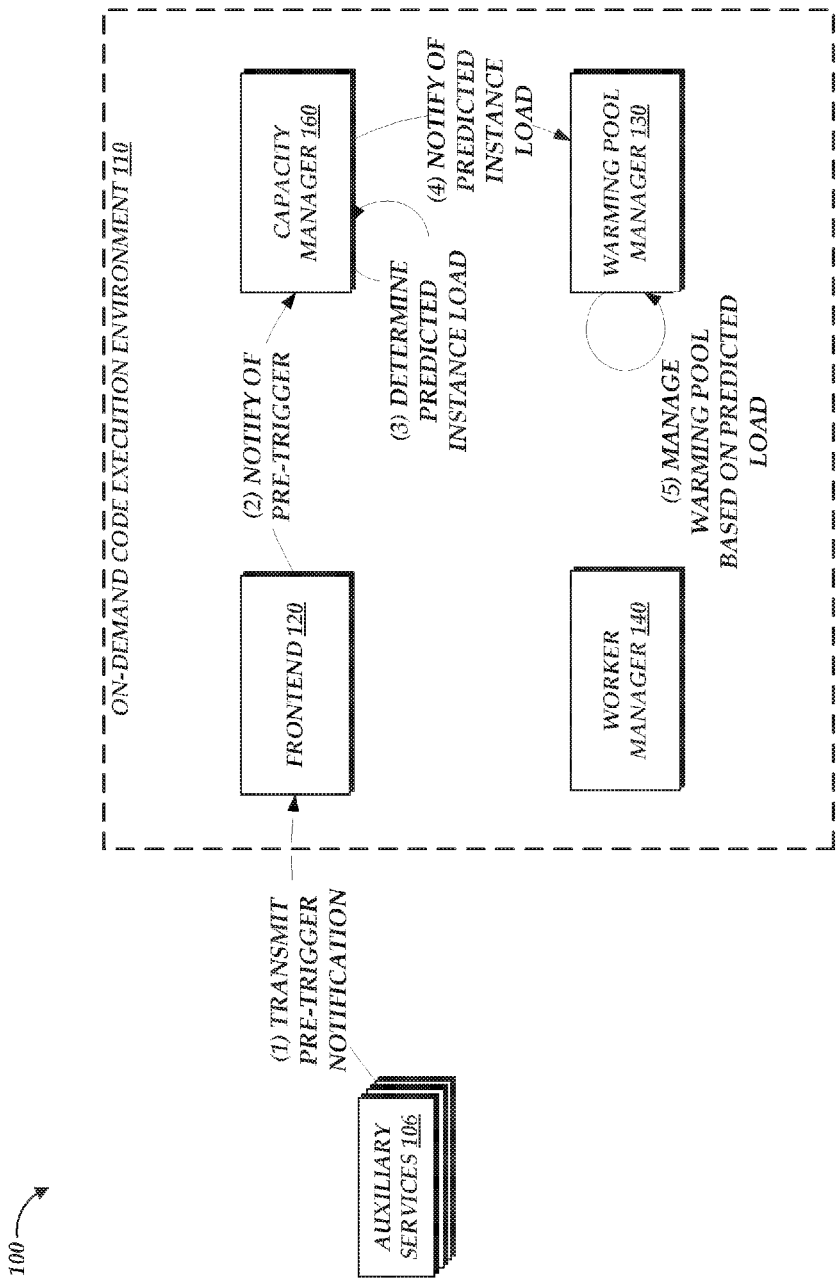
FIG. 3A is a flow diagram depicting illustrative interactions for modifying a number of pre-initialized virtual machine instances within the on-demand code execution environment based on a pre-trigger indicating later use of the pre-initialized virtual machine instances.
Figure 3B:
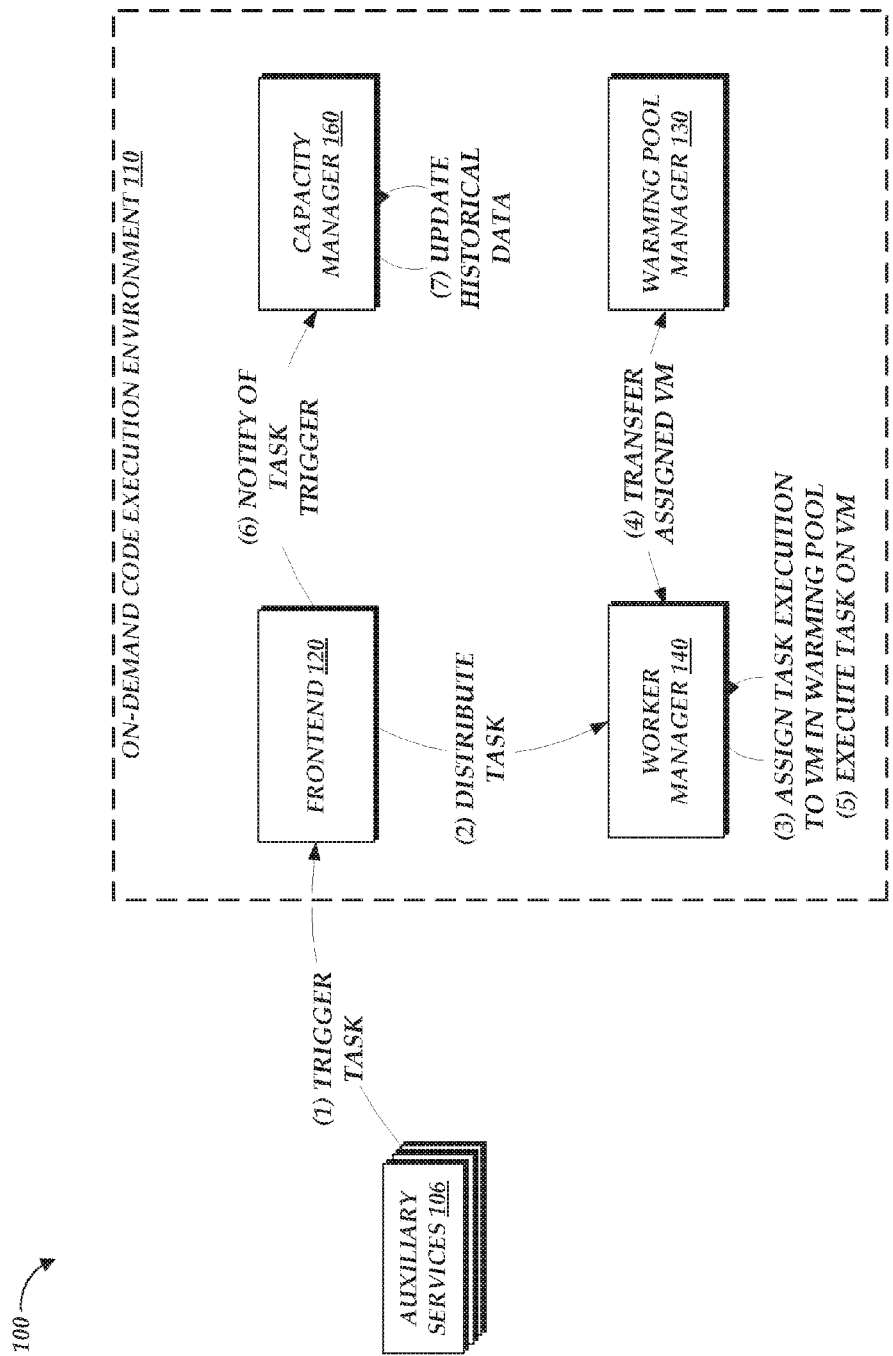
FIG. 3B is a flow diagram depicting illustrative interactions for utilizing pre-initialized virtual machine instances within the on-demand code execution environment to execute tasks triggered subsequent to receipt of a pre-trigger, and to update data indicating a correlation between the pre-trigger and subsequently triggered tasks.

With reference to FIGS. 3A and 3B, illustrative interactions are depicted for utilization of a pre-trigger notification to manage pre-initialized virtual machine instances on the on-demand code execution environment 110. Specifically, FIG. 3A depicts illustrative interactions for detection or reception of a pre-trigger at the on-demand code execution environment 110, and management of virtual machine instances within a warming pool based on that pre-trigger. FIG. 3B depicts illustrative interactions for reception or detection of triggering events subsequent to reception of the pre-trigger notification, for executing tasks in response to those triggering events, and for generating data correlating the pre-trigger notification to the subsequent triggering events, which may be utilized to manage virtual machine instances in response to subsequent pre-trigger notifications.

The interactions of FIG. 3A begin at (1), where an auxiliary service 106 transmits a pre-trigger notification to the frontend 120 of the on-demand code execution environment 110. The pre-trigger notification can notify the on-demand code execution environment 110 of any event occurring at or otherwise known to the auxiliary service 106. In one embodiment, pre-trigger notifications may be selected by an operator of the auxiliary service 106 for their anticipated ability to predict or otherwise precede subsequent triggering of a task on the on-demand code execution environment 110. In another embodiment, pre-trigger notifications may be used to notify the on-demand code execution environment 110 of all or substantially all events occurring on an auxiliary service 106, such that the on-demand code execution environment 110 (e.g., via the analysis engine 166 of the capacity manager 160) may determine a correlation (if any) between each event and any subsequently triggered tasks.

As an illustrative example, where a task on the on-demand code execution environment 110 is utilized to transform an audio speech pattern into text in connection with a voice command device, a pre-trigger notification may indicate to the on-demand code execution environment 110 that an end user has activated the device, or has begun speaking. While such a pre-trigger notification may occur only very shortly before the captured audio speech pattern is actually transmitted to the on-demand code execution environment 110, the pre-trigger notification may nevertheless enable the on-demand code execution environment 110 to begin initialization of a virtual machine instance (e.g., to process that audio speech pattern) at an earlier point in time, thus reducing the latency with which text corresponding to the speech pattern is returned. In environments such as the use of a voice command device, these small and often sub-one-second improvements can significantly improve an end user's satisfaction with a device.

As another illustrative example, where a task on the on-demand code execution environment 110 is utilized to implement a network-based service, such as a web site, a pre-trigger notification may indicate that changes have been made to that network-based service that may increase the load on the service. For example, a pre-trigger notification may indicate that a new product is being released or a sale is occurring on an e-commerce web site that is likely to result in increased access to the site. The on-demand code execution environment 110 may then utilize that pre-trigger notification to initialize additional virtual machine instances, such that when increased access occurs, end users do not experience additional delay or loss of functionalities (which often occur when an above-average number of users attempt to access a network-service).

As yet another illustrative example, where the on-demand code execution environment 110 is utilized to implement functionalities of "IoT" (Internet of Things) devices, pre-trigger notifications may notify the on-demand code execution environment 110 that an individual IoT device has been accessed, which may be predictive of other IoT devices subsequently being accessed. For example, where a user typically enters their home by unlocking a "smart lock" (e.g., an network-accessible door lock), and then subsequently asks a voice-command device to begin music playback, the pre-trigger notification may notify the on-demand code execution environment 110 at each unlocking of the smart lock, such that a pre-initialized virtual machine instance is available to implement tasks on behalf of the voice-command device.

While pre-trigger notifications are described above with reference to events on auxiliary services 106, pre-trigger notifications may additionally or alternatively stem from other sources, including user computing devices 102 or the on-demand code execution environment 110 itself. For example, a pre-trigger notification may indicate that a user of the on-demand code execution environment 110 has transmitted new computer-executable code to the on-demand code execution environment 110, and associated that code with a defined task on the on-demand code execution environment 110. Because users in such instances will often in such situations execute that defined task (e.g., as a "test run"), the transmission of new code to the on-demand code execution environment 110 may function as a pre-trigger notification. In some instances, execution of a task itself may function as a pre-trigger notification. For example, where multiple tasks are often requested in sequence by an auxiliary service 106 or a user computing device 102, the first task in that sequence may act as a pre-trigger notification, indicating that triggering events for later tasks in the sequence are to occur in the near future. As will be appreciated by one of skill in the art, pre-trigger notifications can thus be utilized to notify the on-demand code execution environment 110 of any event that may be predictive of future requests to execute tasks on the on-demand code execution environment 110.

In one embodiment, pre-trigger notifications may simply notify the on-demand code execution environment 110 that a specific pre-trigger event has occurred. For example, the on-demand code execution environment 110, or users of the on-demand code execution environment 110 (either individually, collectively, or in various groupings), may specify a number of individual pre-trigger events (e.g., "end user activates voice command device," "end user unlocks front door," "sale occurring at web site," etc.), and the pre-trigger notification may simply indicate that such an event has occurred. In other embodiments, pre-trigger notifications may include additional information to assist the on-demand code execution environment 110 in determining future task executions corresponding to the pre-trigger event. Such information may include, but is not limited to, a timing of the pre-trigger event (e.g., when a door lock was activated, when a sale is scheduled to begin, etc.), importance or magnitude information (e.g., how important the sale is expected to be), and information specifying expected future task executions on the on-demand code execution environment 110 (e.g., a predicted number of requests to execute task, timing information for those predicted requests, etc.). In some cases, such as where a component transmitting a pre-trigger notification is trusted by the on-demand code execution environment 110, pre-trigger notifications may enable the on-demand code execution to know the exact, or substantially exact, number and type of calls to execute tasks that will subsequently be received.

On receiving the pre-trigger notification, the frontend 120, at (2), notifies the capacity manager of the received pre-trigger notification. The capacity manager 160, in turn, determines a number and/or timing of task executions that are predicted to occur based on the pre-trigger notification. In one embodiment, the capacity manager 160 may utilize information specified within the pre-trigger notification to determine the number and timing of predicted executions. For example, a pre-trigger notification may indicate that n triggering events, each corresponding to a single task execution, are expected to occur in a given period of time. The capacity manager 160 can then utilize that information to determine a predicted "instance load" for the pre-trigger event, indicating a number of virtual machine instances required to serve triggering events predicted to occur based on the pre-trigger notification. In one embodiment, the capacity manager 160 may determine that a single virtual machine instance is required for each task execution caused by a triggering event. Thus, if n triggering events are expected to occur, n virtual machine instances may be required. In another embodiment, the capacity manager 160 may determine that multiple tasks corresponding to the triggering events can be executed on a single virtual machine instance (e.g., based on the user credentials associated with each task, the expected computing resources required to service the task, other attributes of the task, etc.), and thus, that less than n virtual machine instances are required.

In another embodiment, the capacity engine 160 can further be configured to utilize historical information regarding the on-demand code execution environment 110 to correlate pre-trigger notifications to subsequent triggering of tasks. Such historical information may be stored, for example within the data store 164 of the capacity engine 160 (not shown in FIG. 3A). Illustratively, the capacity engine 160 may inspect historical information regarding pre-trigger notifications received with respect to a given user (e.g., from a computing device of the user, under the authority of the user, etc.), as well as subsequent task calls received with respect to a given user, in order to determine correlations between such pre-trigger notifications and task calls. As a further illustration, the capacity engine 160 may inspect historical information regarding groups of pre-trigger notifications (e.g., pre-trigger notifications within a specific category), as well as task calls occurring subsequent to such groups of pre-trigger notifications, to determine correlations between the groups of pre-trigger notifications and subsequent task calls. Generation of historical information regarding pre-triggers and task calls will be discussed in more detail with respect to FIG. 3B, below.

Illustratively, the capacity engine 160 may utilize historical information to compare each prior pre-trigger notification of a given type received from an individual user to subsequent tasks executed on behalf of that user (e.g., all subsequent tasks, subsequent tasks received prior to a next pre-trigger notification, subsequent tasks received within a threshold time period after receiving the pre-trigger notification, etc.), to determine correlations between those pre-trigger notifications and subsequent tasks. In one embodiment, the capacity engine 160 may determine an average number and timing of task executions that occur for a user after receiving a given pre-trigger notification for that user, and utilize that information as predictive for subsequent occurrences of the pre-trigger notification. For example, where a given pre-trigger notification results in an average of three triggering events for a task an average of thirty seconds after receipt of the pre-trigger notification, the capacity engine 160 may predict that subsequent receipt of that pre-trigger notification will result in an average of three triggering events being detected thirty seconds later. In some instances, the capacity engine 160 may provide additional statistical information, such as an expected variance in the number of timing of triggering events predicted to occur subsequent to the pre-trigger notification. In still more instances, the capacity engine 160 may generate a distribution model (e.g., as may be represented as a chart or graph) for the number and timing of triggering events occurring subsequent to a pre-trigger notification. For example, with respect to a given pre-trigger notification, the capacity engine 160 may generate a distribution that plots the number of event triggers expected to occur versus the time passing subsequent to the pre-trigger notification. In instances where little or no historical information is available regarding correlations between a pre-trigger notification and subsequent task executions, the capacity manger 160 may utilize a default prediction (e.g., predicting zero subsequent task executions) until additional historical information is gathered (e.g., via the interactions of FIG. 3B, described below).

In one embodiment, correlations between pre-trigger notifications and subsequent task executions may be maintained for individual users, such that pre-trigger notifications of a given user are correlated to subsequent task executions by that user. In other embodiments, correlations between pre-trigger notifications and subsequent task executions may be maintained for groups of users. For example, a pre-trigger notification received for a first user in a given collection of users (e.g., users who have self-associated with one another, users with similar demographic or historical use information, users operating in similar industries, etc.) may be correlated to subsequent task executions on behalf of other users in that collection of users. Still further, in some embodiments, correlations between pre-trigger notifications and subsequent task executions may be maintained for similar pre-trigger notifications and/or similar subsequent task executions. For example, where two unrelated users utilize the same or similar pre-trigger notifications, historical correlation data of a first user may be utilized to predict a correlation between the pre-trigger notifications and task executions of a second user. In some instances, any or all of the above correlation data may be combined (e.g., via a linear algorithm), with each set of correlation data weighted according to the expected accuracy of the data with respect to a given user. For example, historical data regarding the user themselves may be weighted highly, historical data regarding other users that are associated with the given user may be weighted at a medium level, and correlation data regarding similar pre-triggers may be weighted at a low level. Different correlation data may also be weighted according to the volume of data available, such that where a low volume of historical data is available for an individual user, that historical data is weighted less than a high volume of historical data regarding similar users. Thus, correlations between pre-trigger notifications and subsequent task executions can be determined even when data regarding an individual user is not available on the on-demand code execution environment 110.

While analysis of historical information is described herein with respect to FIG. 3A, in some embodiments such analysis can be conducted (e.g., by the capacity manager 160) periodically, or otherwise asynchronously to the receipt of pre-trigger notifications. For example, the capacity manager 160 may analyze correlations between pre-trigger notification and subsequent task executions during periods of low use on the on-demand code execution environment 110 (e.g., by executing a task on the on-demand code execution environment 110 that implements the analysis described herein), and store a set of criteria enabling the predicted instance load associated with an individual pre-trigger notification to be quickly determined. For example, the capacity manager 160 may generate, for each combination of a pre-trigger notification and user of the on-demand code execution environment 110, a corresponding predicted instance load. Thus, on receipt of any given pre-trigger notification from any given user (or under the credentials of any given user), the predicted instance load may be quickly determined.

After determining the predicted instance load (e.g., the number of virtual machine instances needed to service task executions that are predicted to occur based on a pre-trigger notification), the capacity manager, at (4), can notify the warming pool manager 130 of the predicted instance load. The warming pool manager 130 can then, at (5), manage the instances within the warming pool based on the predicted load. Illustratively, where the predicted instance load is expected to fall with the normal capacity of the warming pool 130, no action may be required by the warming pool manager 130. Where the predicted load is expected to exceed the capacity of the warming pool 130, the warming pool manager 130 may add virtual machine instances to the warming pool 130A as necessary to service the predicted future task executions. The addition of virtual machine instances to a warming pool is described in more detail in the '648 Application (e.g., at FIG. 1 of the '648 Application), which is incorporated by reference above. In one embodiment, the warming pool manager 130 may increase the number of virtual machine instances by the predicted instance load, to ensure that the predicted number of task executions occurring based on the pre-trigger notification does not reduce the number of instances in the warming pool below their typical level. In another embodiment, the warming pool manager 130 may add instances to the warming pool as necessary to ensure that the number of instances in the warming pool exceeds the predicted instance load. In yet another embodiment, where the predicted instance load indicates a timing of executions subsequent to the pre-trigger notification, the warming pool may modify the number of instances in the warming pool over a period of time, to ensure that adequate virtual machine instances are available at or before the point in time at which executions are expected to occur. Thus, the on-demand code execution environment 130 can dynamically manage the number of pre-initialized virtual machine instances that are available to service incoming requests to execute tasks, such that those tasks can be quickly executed without the delay necessary to initialize a virtual machine instance.

One of skill in the art will appreciate that the additional or alternative interactions may occur within the context of FIG. 3A, or that the ordering of these interactions may vary within specific implementations. For example, the capacity manager 160 is described above as determining a predicted instance load, based on a predicted number of subsequent task executions. However, in some embodiments, the warming pool manager 130 may be configured to determine such a predicted instance load (e.g., using the same or similar processes described above). Accordingly, rather than transmitting a predicted instance load to the warming pool manger 130, the capacity manager 160 may transmit an indication of the number and/or timing of task executions predicted to occur based on a pre-trigger notification, which the warming pool manger 130 may thereafter use to determine the predicted instance load. As a further example, while the predicted instance load above is described with respect to the timing and number of virtual machine instances required to execute predicted subsequent task executions, the predicted instance load may additionally or alternatively indicate requirements or preferred configurations of virtual machine instances. For example, where the predicted task executions correspond to executable code written in a specific language, or requiring a specific runtime environment, the predicted instance load may indicate that virtual machine instances will be required that are capable of executing code written in that specific language, or that are running the specific runtime environment. Further, while the embodiments described above refer to the use of the warming pool manager 130 to manage the instances within the warming pool based on the predicted instance load, other embodiments of the present disclosure may additionally or alternative utilize the worker manager 140 to manage instances within an active pool based on predicted instance load. For example, the worker manager 140 may decline to de-initialize or shutdown instances from the active pool, when those instances are predicted to be utilized based on a received pre-trigger notification. In some instances, either or both of the worker manager 140 and warming pool manager 130 may modify a set of policies that determine when virtual machine instances are de-initialized or otherwise removed from a pool, to ensure that such pools maintain adequate levels to service predicted future executions. Still further, in some embodiments, predicted future executions may be utilized to modify other aspects of the on-demand code execution environment 110, such as the computing resources utilized to implement virtual machine instances or to facilitate execute of tasks on those virtual machine instances. For example, where the on-demand code execution environment 110 utilizes or has access to dynamically provisioned computing resources (such as dynamically provisioned network-based storage space, scalable access to processing power, etc.), the on-demand code execution environment 110 may modify an amount of one or more of those dynamically provisioned computing resources. For example, the on-demand code execution environment 110 may interact with a dynamically allocated network storage service (not shown in FIG. 3A) to increase the amount of data storage available to virtual machine instances. Thus, the interactions of FIG. 3A are intended to be illustrative in nature.

With reference to FIG. 3B, interactions for servicing task executions occurring subsequent to a pre-trigger notification will be described. Illustratively, the interactions of FIG. 3B may occur at a point in time subsequent to the interactions of FIG. 3A.

The interactions of FIG. 3B begin at (1), where an auxiliary service 106 triggers the execution of a task on the on-demand code execution environment 110. Triggering of a task may occur according to any number of user-defined criteria, including but not limited to transmission of an API call or specially configured HTTP packet, or modification of data on the auxiliary service 106 (e.g., uploading of a new file to a storage service). While triggering of a task is depicted in FIG. 3B as occurring based on an auxiliary service 106, other devices, such as a user computing device 102 or components of the on-demand code execution environment 110 itself may additionally or alternatively trigger tasks.

Thereafter, at (2), the frontend 120 distributes the task to the worker manager 140 for execution. The worker manager 140, in turn, finds capacity to execute the task on the on-demand code execution environment 110. For example, if there exists a particular virtual machine instance in the active pool 140A (shown in FIG. 1) that has a container with the user code of the task already loaded therein, the worker manager 140 may assign the container to the task and cause the task to be executed in the container. Alternatively, if the user code of the task is available in the local cache of one of the virtual machine instances, the worker manager 140 may create a new container on such an instance, assign the container to the task, and cause the used code to be loaded and executed in the container. However, for the purposes of FIG. 3B, it will be assumed that no virtual machine instance in the active pool 140A is suitable or preferred for execution of the task. Thus, the worker manager 140, at (3), assigns the task execution to a new virtual machine instance within the warming pool 130A (shown in FIG. 1). In one embodiment, each virtual machine instance within the warming pool 130A is identically configured, and thus, the specific virtual machine instance may be assigned at random or according to any ordering. In another embodiment, a specific virtual machine instance may be selected based on characteristics of the task (e.g., the language utilized by code corresponding to the task, the runtime environment required by the task, the user on behalf of whom the task is executed, etc.).

At (4), the worker manager 140 interacts with the warming pool manager 130 to transfer the assigned virtual machine instance from the warming pool 130A to the active pool 140A. Because the number and/or configuration of virtual machine instances in the warming pool 130A has been managed based on prior pre-trigger notifications, it is expected that sufficient capacity exists in the warming pool '130A to execute the task, and thus, the transfer of a virtual machine instance between the warming pool 130A and the active pool 140A can occur quickly, without delay cause by initializing a virtual machine instance within the warming pool 130A. After transfer of the virtual machine instance, the worker manager 140, at (5), causes computer executable instructions corresponding to the task to be executed on the virtual machine instance, thus implementing any desired functionality in response to the triggered task.

In addition, to execution of tasks in response to a triggering of the task, the interactions of FIG. 3B may further update the historical data used to correlate pre-trigger notifications to subsequent triggering of tasks. Specifically, at (6), the frontend 120 can notify the capacity manager 160 of the received task trigger. The capacity manager 160, in turn, can update historical data regarding received task triggers, to enable correlations to be determined between a pre-trigger notification and subsequent triggering of tasks. In one embodiment, the capacity manager 160 can store an indication that a task was triggered, along with any relevant information regarding the triggering of the task (e.g., the cause of the triggering, user associated with the triggered task, parameters provided by an auxiliary service in triggering the task, etc.). In another embodiment, the capacity manager 160 can store an association between the occurrence of the triggered task and a previously received pre-trigger notification. For example, the capacity manager 160 may automatically associate triggered tasks for a given user with the most recent pre-trigger notification associated with that user, or the most recent pre-trigger notification received within a threshold period of time. This information can then be utilized to determine correlations between pre-trigger notifications and subsequent triggering of tasks, as described above. In some instances, the historical data used to correlate pre-trigger notifications to subsequent triggering of tasks may also be transmitted to one or more auxiliary services 106, such as logging, billing, or monitoring services.

One of skill in the art will appreciate that the additional or alternative interactions may occur within the context of FIG. 3B, or that the ordering of these interactions may vary within specific implementations. For example, while interactions (6) and (7) are described as subsequent to interactions (2) through (5), these interactions (6) and (7) may occur prior to or simultaneously with interactions (2) through (5). Thus, the interactions of FIG. 3B are intended to be illustrative in nature.

Figure 4:
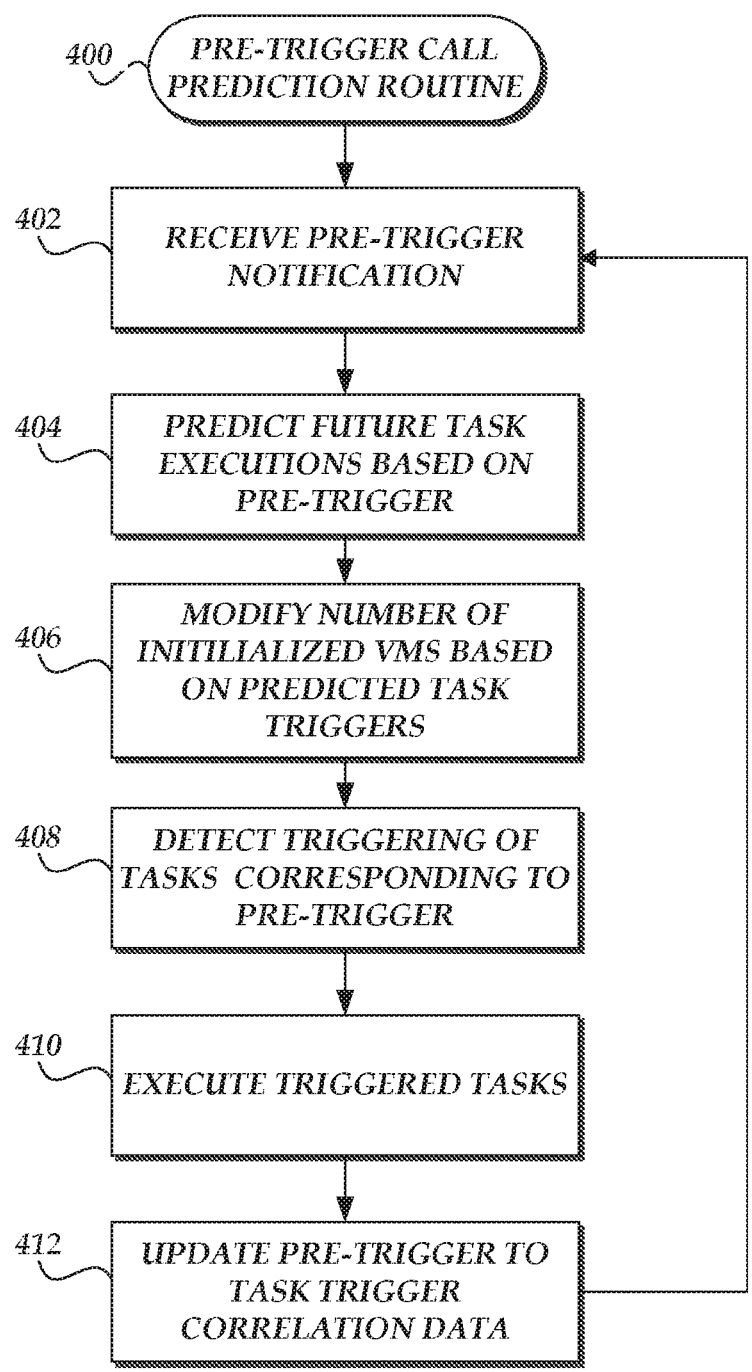
FIG. 4 is a flow chart depicting an illustrative routine for managing a number of pre-initialized virtual machine instances within an on-demand code execution environment based on pre-triggers indicating later use of the pre-initialized virtual machine instances, and for updating data indicating a correlation between the pre-triggers and subsequently triggered tasks.

With reference to FIG. 4, a block diagram depicting an illustrative routine 400 for utilizing pre-triggers to manage initialized virtual machine instances on an on-demand code execution environment 110 will be described. The routine 400 begins at block 402, where a pre-trigger notification is received at the on-demand code execution environment 110. As noted above, a pre-trigger notification can indicate the occurrence of any event at auxiliary services, end user computing devices, or the on-demand code execution environment 110 itself, that is indicative of subsequent or future task executions on the on-demand code execution environment 110. In one embodiment, the pre-trigger notification also includes additional information regarding the event, such as timing of the event, magnitude or importance of the event, or an estimated number or timing of tasks executions expected to occur based on the event.

At block 404, the on-demand code execution environment 110 can predict a number or timing of future task executions to occur based on the received pre-trigger notification. In one embodiment, future task executions may be predicted based on information directly included within the pre-trigger notification. In another embodiment, future task executions may be predicted in whole or in part based on historical information correlating the pre-trigger notification to subsequent task executions. For example, where a pre-trigger notification does not include an estimated number or timing of task executions that are expected to occur, historical information may indicate that an average distribution of task executions that have occurred after prior instances of the pre-trigger notification, and that distribution may be utilized to predict future task executions based on the current pre-trigger notification. Where a pre-trigger notification does include an estimated number or timing of task executions that are expected to occur, historical information may be utilized to modify that number or timing (e.g., by assigning an expected confidence to the values provided within the pre-trigger notification).

Thereafter, at block 406, the on-demand code execution environment 110 can modify a number of initialized virtual machines that are maintained, to ensure that sufficient virtual machines are initialized and available to process the predicted future task executions, should they occur. Specifically, the on-demand code execution environment 110 may determine a number of virtual machine instances that would be required to satisfy the predicted future task executions (e.g., based on a fixed number of concurrent tasks executable by an individual instance, based on characteristics of the task executions, etc.). Thereafter, the on-demand code execution environment 110 may ensure that at least that number of virtual machine instances are pre-initialized at the on-demand code execution environment 110, or will be pre-initialized at the points in time at which the future task executions are expected to occur. Implementation of block 406 may include, for example, adding instances to a warming pool of pre-initialized virtual machine instances, verification that a current number of instances in the warming pool is sufficient to satisfy predicted future task executions, or removing instances from the warming pool. Implementation of block 406 may further include modifying instances within an active pool (e.g., by adding instances to the active pool, declining to de-initialize instances from the active pool, etc.).

At block 408, the on-demand code execution environment 110 can detect a triggering of one or more tasks corresponding to the pre-trigger notification (e.g., executing under the credentials of the same user or account associated with the pre-trigger notification). Triggering of a task may correspond, for example, to reception of an API call at the on-demand code execution environment 110 or detection of new data at an auxiliary service. Thereafter, at block 410, the on-demand code execution environment 110 can execute the triggered tasks (e.g., utilizing the pre-initialized virtual machine instances added to the warming pool based on the pre-trigger notification. In addition, at block 412, the on-demand code execution environment 110 can update historical data indicating a correlation between the pre-trigger notification and the subsequent triggering of the task. In some instance, updating of historical data may also include updating statistical information regarding the received pre-trigger notification (e.g., the number and timing of triggering events for tasks expected to follow after the pre-trigger notification), such that later processing of a pre-trigger notification can occur without requiring generation of that statistical information. The routine 400 may then return to block 402, and proceed in a potentially continuous loop until terminated by the on-demand code execution environment 110.

The routine 400 may be altered based on the requirements of the on-demand code execution environment 110. For example, in some embodiments of the present disclosure various functionalities described with respect to the routine 400 may be implemented in parallel, or as separate routines. For example, block 702 may be implemented as a first routine (e.g., running at fixed intervals on the on-demand code execution environment 110 or in response to a user request to enable active monitoring for specific tasks), blocks 704 and 706 may be implemented as a second routine (e.g., running continuously to actively monitor specific calls or executions), and blocks 708 through 712 may be implemented as a third routine implemented in response to user requests to provide task profiles. Division of the routine 700 into multiple parallel routines may advantageously increase the speed of various functionalities of the routine 700, for example, where the on-demand code execution environment 110 utilizes parallel processing techniques. In some embodiments, one or more portions of the routine 700 may be carried out by other systems or devices, including systems or devices external to the on-demand code execution environment, which provide information to the task profiler 700. For example, blocks 702-706 may be implemented (collectively or individually) by a frontend of the on-demand code execution environment 110, while blocks 708-712 are implemented by the capacity manager 160 or other component of the on-demand code execution environment 110.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing low-latency computational capacity in an on-demand code execution environment, the system comprising:
   a data store including historical data regarding use of the on-demand code execution environment, the historical data correlating pre-trigger notifications previously obtained at the on-demand code execution environment with one or more requests to execute first user-specified code obtained at the on-demand code execution environment subsequent to individual pre-trigger notifications, wherein the pre-trigger notifications are obtained from one or more computing systems associated with the user-specified code and distinct from the on-demand code execution environment, and wherein the pre-trigger notifications are requests to execute second user-specified code that are distinct from the requests to execute the first user-specified code that are obtained subsequent to the individual pre-trigger notifications; and
   one or more computing devices in communication with the data store and executing the computer-executable instructions, wherein execution of the computer-executable instructions causes the one or more computing devices to:
      maintain a set of virtual machine instances that are pre-initialized with an operating environment and made available for execution of the first user-specified code;
      obtain, from the one or more computing systems, an additional pre-trigger notification requesting execution of the second user-specified code;
      determine, based at least in part on comparing the additional pre-trigger notification to the historical data correlating pre-trigger notifications previously obtained at the on-demand code execution environment, a number of requests to execute the first user-specified code that are predicted to occur subsequent to obtaining the additional pre-trigger notification;
      based on the number of requests to execute the first user-specified code that are predicted to occur subsequent to obtaining the additional pre-trigger notification, increase a number of virtual machine instances within the set of virtual machine instances at least partly by initializing at least one new virtual machine instance with an operating environment and adding the at least one new virtual machine instance to the set of virtual machine instances;
      obtain a request to execute the first user-specified code, wherein the request is associated with the pre-trigger notification; and
      execute the first user-specified code on the previously initialized operating environment of the at least one new virtual machine instance.

2. The system of claim 1, wherein execution of the computer-executable instructions causes the one or more computing devices to generate the historical data based at least in part on:
   for individual pre-trigger notifications of a plurality of pre-trigger notifications obtained at the on-demand code execution environment, determining a set of requests to execute the user-specified code occurring subsequent to the individual pre-trigger notifications;
   generate statistical information indicating a likelihood that an individual pre-trigger notification will result in a subsequent number of requests to execute the user-specified code;
   store the statistical information within the data store as the historical data.

3. The system of claim 1, wherein execution of the computer-executable instructions causes the one or more computing devices to generate the historical data based at least in part on:
   identifying a set of pre-trigger notifications that are associated with one another;
   determining a set of requests to execute the first user-specified code occurring subsequent to the set of pre-trigger notifications;
   generate statistical information indicating a likelihood that the set of pre-trigger notifications will result in a subsequent number of requests to execute the first user-specified code;
   store the statistical information within the data store as the historical data.

4. The system of claim 1, wherein the request to execute the first user-specified code comprises at least one of an application programming interface (API) call, a hypertext transport protocol (HTTP) transmission, or a request generated by the on-demand code execution environment in response to data obtained from an external service.

5. The system of claim 4, wherein execution of the computer-executable instructions further causes the one or more computing devices to increase a rate at which the external service is polled for the data.

6. The system of claim 1, wherein the pre-trigger notification indicates an anticipated number of requests to execute the user-specified code, and wherein determining the number of requests to execute the user-specified code that are predicted to occur subsequent to obtaining the pre-trigger notification includes modifying the anticipated number of requests based at least in part on the historical data.

7. The system of claim 1, wherein each pre-trigger notification corresponds to a type of event, and wherein the data store further includes historical data for one or more additional pre-trigger notifications corresponding to different types of events.

8. A computer-implemented method of providing low-latency computational capacity in an on-demand code execution environment, the computer-implemented method comprising:
   maintaining a set of execution environments that are pre-initialized with an operating environment and made available for execution of first user-specified code;
   obtaining a pre-trigger notification indicating that a likelihood that one or more requests to execute first user-specified code will be obtained at the on-demand code execution environment subsequent to the pre-trigger notification, wherein the pre-trigger notification is obtained from one or more computing systems associated with the first user-specified code and distinct from the on-demand code execution environment, and wherein the pre-trigger notification is a request to execute second user-specified code and is distinct from the one or more requests to execute the first user-specified code;

determining, based at least in part on the pre-trigger notification representing the request to execute the second user-specific code, a number of requests to execute the first user-specified code that are predicted to occur subsequent to obtaining the pre-trigger notification;

based at least partly on the number of requests that are predicted to occur, managing a number of execution environments within the set of execution environments;

obtaining a request to execute the first user-specified code, wherein the request is associated with the pre-trigger notification; and executing the first user-specified code on at least one execution environment of the set of execution environments.

9. The computer-implemented method of claim 8, wherein the set of execution environments includes at least one of a set of virtual machine instances or a set of software containers.

10. The computer-implemented method of claim 8, wherein managing the number of execution environments within the set of execution environments includes at least one of increasing the number of execution environments within the set of execution environments, declining to de-initialize at least one execution environment within the set of execution environments that would otherwise be designated for de-initialization, or modifying a set of policies that determine when execution environments are de-initialized.

11. The computer-implemented method of claim 8 further comprising generating statistical information regarding previous pre-trigger notifications received at the on-demand code execution environment and requests to execute the first user-specified code that are correlated to those previous pre-trigger notifications, wherein the number of requests to execute the first user-specified code that are predicted to occur subsequent to obtaining the pre-trigger notification is determined based at least in part on the statistical information.

12. The computer-implemented method of claim 11, wherein the statistical information includes a distribution modeling a number and timing of requests to execute the first user-specified code that are expected to occur subsequent to an individual pre-trigger notification.

13. The computer-implemented method of claim 8 further comprising determining a number of virtual machine instances capable of servicing the requests predicted to occur subsequent to obtaining the pre-trigger notification.

14. The computer-implemented method of claim 13, wherein the number of virtual machine instances capable of servicing the requests predicted to occur subsequent to obtaining the pre-trigger notification is determined based at least in part on the first user-specified code.

15. The computer-implemented method of claim 13, wherein increasing the number of virtual machine instances within the set of virtual machine instances comprises increasing the number of virtual machine instances within the set of virtual machine instances by at least the number of virtual machine instances capable of servicing the requests predicted to occur subsequent to obtaining the pre-trigger notification.

16. The computer-implemented method of claim 8 further comprising determining an expected timing of the requests to execute the first user-specified code that are predicted to occur subsequent to obtaining the pre-trigger notification.

17. The computer-implemented method of claim 16, wherein increasing a number of virtual machine instances within the set of virtual machine instances comprises increasing a number of virtual machine instances within the set of virtual machine instances in accordance with the expected timing of the requests.

18. The computer-implemented method of claim 16 further comprising, based at least partly on the number of requests that are predicted to occur, managing computing resources available to the set of execution environments.

19. Non-transitory computer-readable storage media comprising computer-executable instructions executable by a computing system associated with an on-demand code execution environment to cause the computing system to:

obtain a pre-trigger notification indicating that a likelihood that one or more requests to execute first user-specified code will be obtained at the on-demand code execution environment subsequent to the pre-trigger notification, wherein the pre-trigger notification is obtained from one or more computing systems associated with the user-specified code and distinct from the on-demand code execution environment, and wherein the pre-trigger notification is a request to execute second user-specified code and is distinct from the one or more requests to execute the first user-specified code;

determine, based at least in part on the pre-trigger notification, a number of requests to execute the first user-specified code that are predicted to occur subsequent to obtaining the pre-trigger notification;

based at least partly on the number of requests that are predicted to occur, managing a number of execution environments on the on-demand code execution environment that are available to execute the first user-specified code;

obtain at least one request to execute the first user-specified code, wherein the request is associated with the pre-trigger notification; and transmit instructions to the set of execution environments to execute the first user-specified code on the previously initialized operating environment.

20. The non-transitory computer-readable storage media of claim 19, wherein the computer-executable instructions cause the computing system to determine the number of requests to execute the first user-specified code that are predicted to occur subsequent to obtaining the pre-trigger notification at least partly by extracting, from the pre-trigger notification, an anticipated number of requests indicated within the pre-trigger notification.

21. The non-transitory computer-readable storage media of claim 19, wherein the computer-executable instructions further cause the computing system to generate statistical information regarding previous pre-trigger notifications received at the on-demand code execution environment and requests to execute the first user-specified code that are correlated to those previous pre-trigger notifications, wherein the number of requests to execute the first user-specified code that are predicted to occur subsequent to obtaining the pre-trigger notification is determined based at least in part on the statistical information.

22. The non-transitory computer-readable storage media of claim 19, wherein the computer-executable instructions further cause the computing system determine an expected timing of the requests to execute the first user-specified code that are predicted to occur subsequent to obtaining the pre-trigger notification.

23. The non-transitory computer-readable storage media of claim 19, wherein the computer-executable instructions further cause the computing system to determine a number of virtual machine instances capable of servicing the requests predicted to occur subsequent to obtaining the pre-trigger notification.

24. The non-transitory computer-readable storage media of claim 23, wherein the at least one new virtual machine instance includes at least the number of virtual machine instances capable of servicing the requests predicted to occur subsequent to obtaining the pre-trigger notification is determined based at least in part on the first user-specified code.

* * * * *